US007853049B2

(12) United States Patent
Lee et al.

(10) Patent No.: US 7,853,049 B2
(45) Date of Patent: Dec. 14, 2010

(54) FACE FEATURE EXTRACTION APPARATUS AND METHOD

(75) Inventors: Yong Jin Lee, Gyeonggi-do (KR); Kyung Hee Lee, Gyeonggi-do (KR); Sung Bum Pan, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1134 days.

(21) Appl. No.: 11/202,874

(22) Filed: Aug. 12, 2005

(65) Prior Publication Data

US 2010/0021018 A1 Jan. 28, 2010

(30) Foreign Application Priority Data

Apr. 21, 2005 (KR) ..................... 10-2005-0033206

(51) Int. Cl.
*G06K 9/00* (2006.01)

(52) U.S. Cl. ..................................................... 382/118

(58) Field of Classification Search ......... 382/115-118, 382/124-127

See application file for complete search history.

(56) References Cited

U.S. PATENT DOCUMENTS 5,164,992 A * 11/1992 Turk et al. .................. 382/118
6,108,437 A * 8/2000 Lin ............................ 382/118
6,272,238 B1 * 8/2001 Kugai ......................... 382/165
6,345,109 B1 * 2/2002 Souma et al. ............... 382/118
7,054,468 B2 * 5/2006 Yang .......................... 382/118
7,454,062 B2 * 11/2008 Nishiyama et al. .......... 382/181
2003/0198366 A1 * 10/2003 Fukui et al. ................ 382/118

FOREIGN PATENT DOCUMENTS

KR 20030072192 9/2003

OTHER PUBLICATIONS

'Local feature analysis: a general statistical theory for object representation' Penev et al., Network: Computation in Neural Systems 7 (1996) 477-500. Printed in the UK.

'Local and Global Feature Analysis for Face Recognition' Lee et al., 2004 Korea Information Science Society, Fall Academic Journal, vol. 31, No. 2 (A full English translation is also enclosed.).

* cited by examiner

*Primary Examiner*—Anand Bhatnagar
*Assistant Examiner*—Alex Liew
(74) *Attorney, Agent, or Firm*—Ladas & Parry LLP

(57) ABSTRACT

A face feature extraction apparatus and method are provided. The face feature extraction apparatus for used in a two-dimensional (2D) face identification system includes: a local base vector generator generating a plurality of local base vectors to extract features of portions of a face from input 2D face image data of users; a local base vector selector selecting a predetermined number of local base vectors suitable for the face identification from the plurality of local base vectors generated by the local base vector generator; and a local base vector overlapper overlapping the local base vectors selected by the local base vector selector and generating a smaller number of overlapped local base vectors than the selected local base vectors. Thus, 2D face identification system having high face identification rate can be provided.

12 Claims, 8 Drawing Sheets

| Rank | (a):178 | (b):199 | (c):17 | (d):158 |
|---|---|---|---|---|
| 1 | 60.57 | 71.71 | 82.29 | 94.29 |
| 2 | 70.00 | 79.14 | 88.29 | 96.57 |
| 3 | 75.43 | 81.14 | 92.00 | 98.00 |
| 4 | 77.43 | 83.43 | 93.43 | 98.57 |
| 5 | 77.71 | 84.57 | 94.00 | 98.86 |

FACE FEATURE EXTRACTION APPARATUS AND METHOD

This application claims the benefit of Korean Patent Application No. 10-2005-0033206, filed on Apr. 21, 2005, in the Korean Intellectual Property Office, the disclosure of which is incorporated herein in its entirety by reference.

BACKGROUND OF THE INVENTION

1. Field of the Invention

The present invention relates to a face feature extraction apparatus and method, and more particularly, to a face feature extraction apparatus and method for a two-dimensional (2D) face identification system having high face identification rate.

2. Description of the Related Art

Face identification can be performed using two-dimensional (2D) photo based method and three-dimensional (3D) modeling based method. The 3D modeling based face identification method has a high identification rate and stable performance in a variety of environments, however, it requires expensive equipment and a user face cannot be identified in real time due to a large computational amount that is performed. The 2D photo based face identification method is greatly influenced by illumination, face direction, and face expressions, however, it does not require expensive equipment and a user's face can be quickly identified.

The most important operation that a 2D photo based face identification system must perform is extraction of face features. Since a large amount of computation is required to identify a user's face from an original face photo having high-level data, the efficiency of the system is reduced. Also, when the original face photo contains factors (e.g., noise) that hinder face identification, the 2D photo based face identification system has a low identification rate. Therefore, it is necessary that a part suitable for face identification is extracted from the original face photo or a face image is re-expressed to be suitable for face identification. A base vector is generally used to extract face features. The base vector is a face description model and face features depend on the base vector. Accordingly, a face feature extraction method includes a base vector generation method.

However, since a conventional 2D photo based face identification system has a low identification rate, an apparatus and method for increasing the face identification rate are required.

SUMMARY OF THE INVENTION

The present invention provides a face feature extraction apparatus and method that use a base vector generation method for extracting a face feature used to identify a face.

According to an aspect of the present invention, there is provided an face feature extraction apparatus for use in a two-dimensional (2D) face identification system, the apparatus comprising: a local base vector generator generating a plurality of local base vectors to extract features of portions of a face from input 2D face image data of users; a local base vector selector selecting a predetermined number of local base vectors suitable for face identification from the plurality of local base vectors generated by the local base vector generator; and a local base vector overlapper overlapping the local base vectors selected by the local base vector selector and generating a smaller number of overlapped local base vectors than the selected local base vectors.

According to another aspect of the present invention, there is provided a face feature extraction method for use by a 2D face identification system, the method comprising: (a) generating a plurality of local base vectors to extract features of portions of a face from input 2D face image data of users; (b) selecting a predetermined number of local base vectors suitable for the face identification from the plurality of local base vectors generated in operation (a); and (c) overlapping the local base vectors selected in operation (b) and generating a smaller number of overlapped local base vectors than the selected local base vectors.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
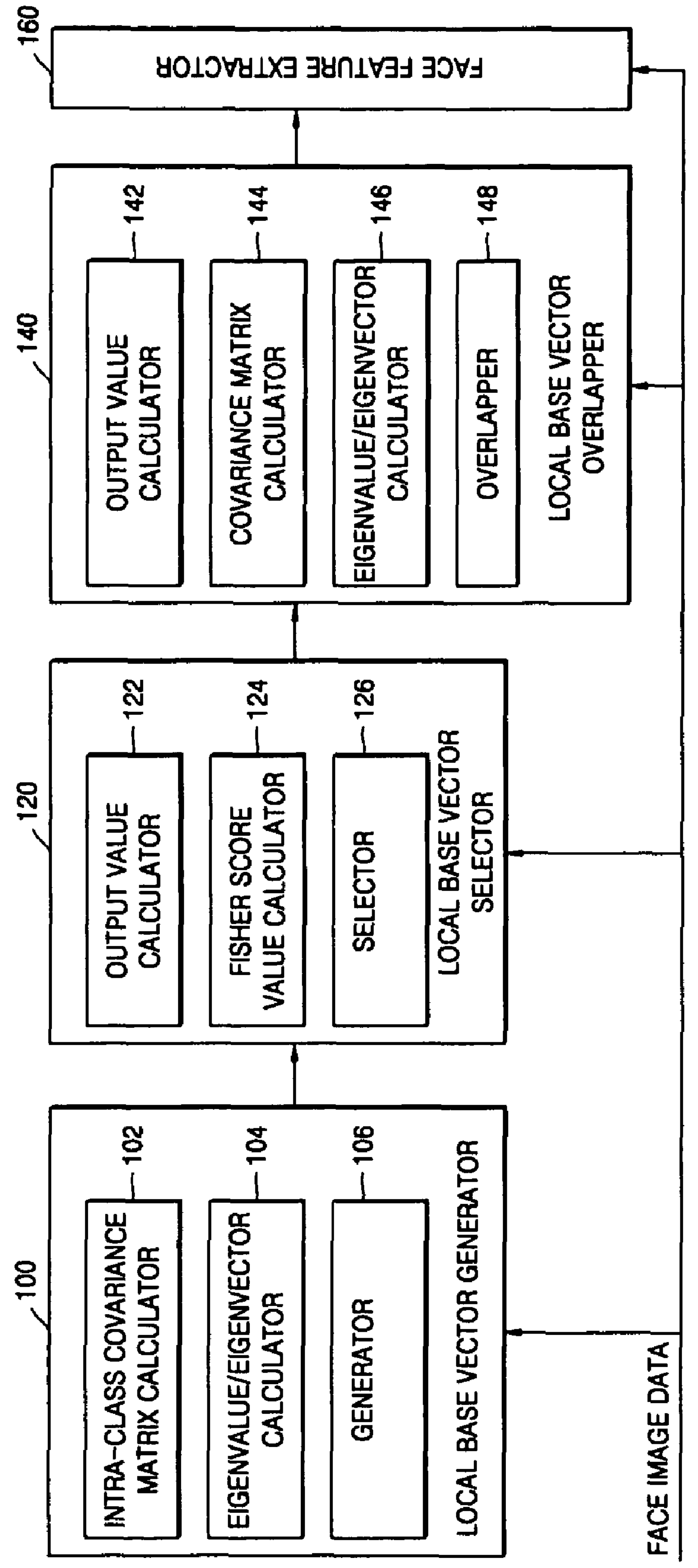
FIG. 1 is a block diagram of a face feature extraction apparatus according to an embodiment of the present invention.

FIG. 1 is a block diagram of a face feature extraction apparatus according to an embodiment of the present invention. Referring FIG. 1, the face feature extraction apparatus comprises a local base vector generator 100, a local base vector selector 120, a local base vector overlapper 140, and a face feature extractor 160.

The local base vector generator 100 generates a plurality of local base vectors to extract features of portions of a face such as eyes, nose, cheeks, chin, the contour of the face, and so on from two-dimensional (2D) face image data of users.

The local base vector selector 120 selects local base vectors suitable for the face identification from the plurality of local base vectors generated by the local base vector generator 100.

The local base vector overlapper 140 overlaps the local base vectors selected by the local base vector selector 120 and generates a smaller number of overlapped local base vectors than the selected local base vectors.

The face feature extractor 160 extracts the face features by linearly projecting the 2D face image data of the users on the local base vectors overlapped by the local base vector overlapper 140.

The local base vector generator 100 comprises an intra-class covariance matrix calculator 102, an eigenvalue/eigenvector calculator 104, and a generator 106.

Assuming that the 2D face image is represented a vector by connecting it with rows or columns, a $t_{th}$ face image of an $i_{th}$ person is indicated as a vector $X_{i,t}$. Then, total number c of persons have $n_i$(i=1, . . . , c) face images, respectively.

The intra-class covariance matrix calculator 102 calculates an intra-class covariance matrix $C_I$ of the face images as shown below, $$C_I = \frac{1}{l}\sum_{i=1}^{c}\sum_{t=1}^{n_i}\sum_{s=1}^{n_i}(x_{i,t} - x_{i,s})(x_{i,t} - x_{i,s})^T = \frac{1}{l}\sum_{i=1}^{c}2n_i\sum_{t=1}^{n_i}(x_{i,t} - m_i)(x_{i,t} - m_i)^T \quad (1)$$

wherein, $$l = \sum_{i=1}^{c} n_i^2 \text{ and } m_i = \frac{1}{n_i}\sum_{t=1}^{c_i} x_{i,t}.$$

In Equation 1, a number l is used to satisfy the mathematical definition of a covariance matrix, and does not influence the actual generation of the local base vector, and $m_i$ is an average face image obtained from face images of the $i_{th}$ person.

The covariance matrix $C_I$ is obtained by collecting face images of some users and calculating a difference vector between face images of the same user. The covariance matrix $C_I$ is also obtained by summing covariance matrices of face images of the c persons, which can be a within-class scatter matrix.

The eigenvalue/eigenvector calculator 104 calculates eigenvalues and eigenvectors of the $C_I$ calculated by the intra-class covariance matrix calculator 102.

The generator 106 generates the local base vector using a predetermined number (e.g., N) of maximum eigenvalues among the eigenvalues calculated by the eigenvalue/eigenvector calculator 104 and eigenvectors matched with the predetermined number (e.g., N) of maximum eigenvalues. The local base vector is generated using the eigenvalues and the eigenvectors as shown below, $$K = U\sum U^T \quad (2)$$

wherein, $$U = [u_1, \ldots, u_n],$$

$$\sum = \text{diag}\left(\frac{1}{\sqrt{\rho_r}}\right), \text{ and } r = 1, \ldots, N.$$

In Equation 2, $\rho_r$ and $u_r$ are the $r_{th}$ maximum eigenvalue of $C_I$ and the eigenvector corresponding to the eigenvalue, respectively, U is a matrix obtained by collecting the eigenvectors of $C_I$, and is a diagonal matrix obtained by collecting inverse numbers of the eigenvalues.

K is a symmetric matrix in which a column vector or a row vector forms a local base vector. That is, K is a universal set of local base vectors.

A column vector indicates a local base vector.

The local base vector K whitens a variance of the coefficient value (or the feature value) obtained by linearly projecting the 2D face image of the user on the intra-class eigenvector U using Σ. The local base vector reduces variation of the difference vector between the face images of the same person. Therefore, the local base vector is used to extract eigen local features of each person.

Figure 2:
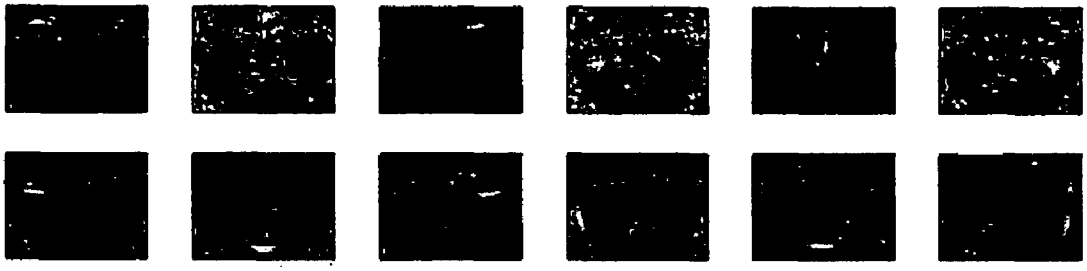
FIG. 2 illustrates local base vectors generated by a local base vector generator illustrated in FIG. 1.

FIG. 2 illustrates the local base vectors generated by the local base vector generator illustrated in FIG. 1. Referring to FIG. 2, the generated local base vectors include shapes of local portions of each of face images including eyes, nose, cheeks, chin, and so on. Therefore, the generated local base vectors are used to effectively extract local features of the face images.

The number of the local base vectors generated by the local base vector generator 100 is the same as the dimension of the face image of a user used to generate the local base vectors. For example, if a 64×64, i.e., a 4096-sized face image photo is used, the local base vector generator 100 generates 4096 local base vectors. Therefore, it is necessary to select a small number of local base vectors suitable for the face identification in order to reduce the computational amount and increase the face identification rate.

The local base vector selector 120 comprises an output value calculator 122, a Fisher Score value calculator 124, and a selector 126.

y (r) is an output value of an $r_{th}$ local base vector of an input image x and is obtained by linearly projecting the input image x onto the $r_{th}$ local base vector as shown below, $$y(r)=K(:,r)^T x \quad (3)$$

wherein, K(:,r) denotes an $r_{th}$ column vector of a matrix K, i.e., the $r_{th}$ local base vector.

The output value calculator 122 calculates an output value by linearly projecting input face image data of a plurality of users on each of the local base vectors generated by the local base vector generator 100.

The Fisher Score value calculator 124 calculates a Fisher Score value of the local base vector that indicates a discrimination power of each of the local base vectors using the output value calculated by the output value calculator 122. For example, a Fisher Score value of the $r_{th}$ local base vector, i.e., J(r), is defined as shown below, $$J(r) = \frac{S_B(r)}{S_W(r)} \quad (4)$$

$$S_B(r) = \sum_{i=1}^{c} n_i(m_i(r) = m(r))^2,$$

wherein, $$S_W(r) = \sum_{i=1}^{c}\sum_{t=1}^{n_i}(y_{i,t}(r) - m_i(r))^2,$$

-continued $$m(r) = \frac{1}{n}\sum_{i=1}^{c} n_i m_i(r),$$

and $$m_i(r) = \frac{1}{n_i}\sum_{t=1}^{n_i} y_{i,t}(r).$$

In Equation 4, c denotes the total number of persons whose face image data is used in the local base vector generator 100, $n_i$ denotes the number of face images of the $i_{th}$ person, n denotes the total number of face images. m (r) denotes an average output of the $r_{th}$ local base vector, and $m_i$ (r) denotes an average output value of the face images of the $i_{th}$ person among the outputs of the $r_{th}$ local base vector, and $y_{i,t}$(r) denotes an output of the $r_{th}$ local base vector of a $t_{th}$ face image of the $i_{th}$ person.

The Fisher Score value is used to measure a discrimination power between classes. A high Fisher Score value of a local base vector indicates that an output value of the local base vector is useful as a face feature for face identification.

Figure 3:
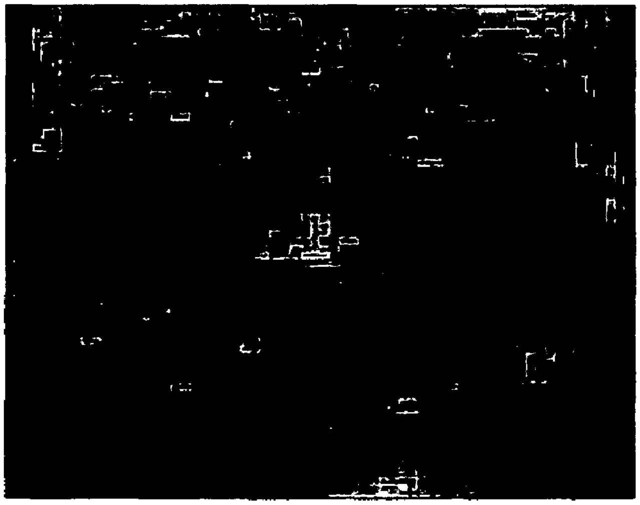
FIG. 3 illustrates a face image for Fisher Score values which are used for selecting a local base vector suitable for face identification performed by a local base vector selector illustrated in FIG. 1.

FIG. 3 illustrates a face image for Fisher Score values which are used for selecting the local base vector suitable for face identification performed by the local base vector selector illustrated in FIG. 1. Referring to FIG. 3, the Fisher Score values of 4096 local base vectors using a 64×64 face image form the face image. White portions indicate high Fisher Score values. The local base vectors corresponding to portions of a face including eyes, nose, cheeks, chin, and the contour of the face have high Fisher Score values.

Figure 4:
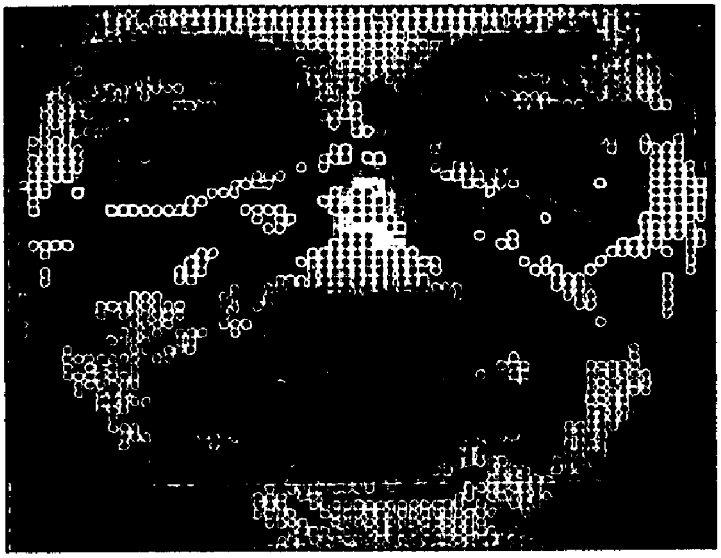
FIG. 4 illustrates an average face image including the locations of local base vectors selected in FIG. 3.

FIG. 4 illustrates an average face image including the locations of the local base vectors selected in FIG. 3. Referring to FIG. 4, the average face image includes the locations of 1300 local base vectors having a high Fisher Score value among the 4096 local base vectors illustrated in FIG. 3.

The local base vector overlapper 140 comprises an output value calculator 142, a covariance matrix calculator 144, an eigenvalue/eigenvector calculator 146, and an overlapper 148.

The output value calculator 142 calculates output values of the local base vectors by linearly projecting the input face image data of the plurality of users on the local base vectors selected by the local base vector selector 120.

The covariance matrix calculator 144 calculates the covariance matrix of the output values of the local base vectors selected by the local base vector selector 120 using the output values calculated by the output value calculator 142.

The eigenvalue/eigenvector calculator 146 calculates eigenvalues of the covariance matrix calculated by the covariance matrix calculator 144 and eigenvectors matched with the eigenvalues.

The overlapper 148 selects a predetermined number of high eigenvalues from the calculated eigenvalues, eigenvectors matched with the selected eigenvalues are determined as overlapping weight values, and overlaps the local base vectors selected by the local base vector selector 120. An overlapping method and the overlapping weight will now be described in detail.

The local base vectors overlapped by the overlapper 148, i.e., g, is as shown below, $$g = \sum_{i=1}^{|I|} K(:, x_i) w_i \tag{5}$$

wherein, denotes an overlapping weight value, denotes an index set of the local base vectors selected by the local base vector selector 120, $x_i$ denotes an element of I, i.e., indexes of the selected local base vectors.

y indicated in vectors by collecting the output values of the local base vectors selected by the local base vector selector 120 with regard to the input image x is defined as shown below, $$y = K(:,I)^T x \tag{6}$$

wherein, K(:,I) denotes the local base vectors selected by the local base vector selector 120.

The overlapping weight value $w_i$ is determined as an eigenvector having a high eigenvalue among the eigenvectors of the covariance matrix P.

The covariance matrix P calculated by the covariance matrix calculator 144 is defined as shown below, $$P = \frac{1}{n}\sum_{t=1}^{n} (y_t - m)(y_t - m)^T \tag{7}$$

wherein, $$m = \frac{1}{n}\sum_{t=1}^{n} y_t.$$

In Equation 7, the relationship between $w=[w_1, \ldots, w_{|I|}]^T$ and P is expressed as shown below, $$\max_{(w^T w=1)} w^T P w \tag{8}$$

The number of w for overlapping the local base vectors and the number of finally overlapped base vectors are determined according to how many eigenvectors are used.

Figure 5:
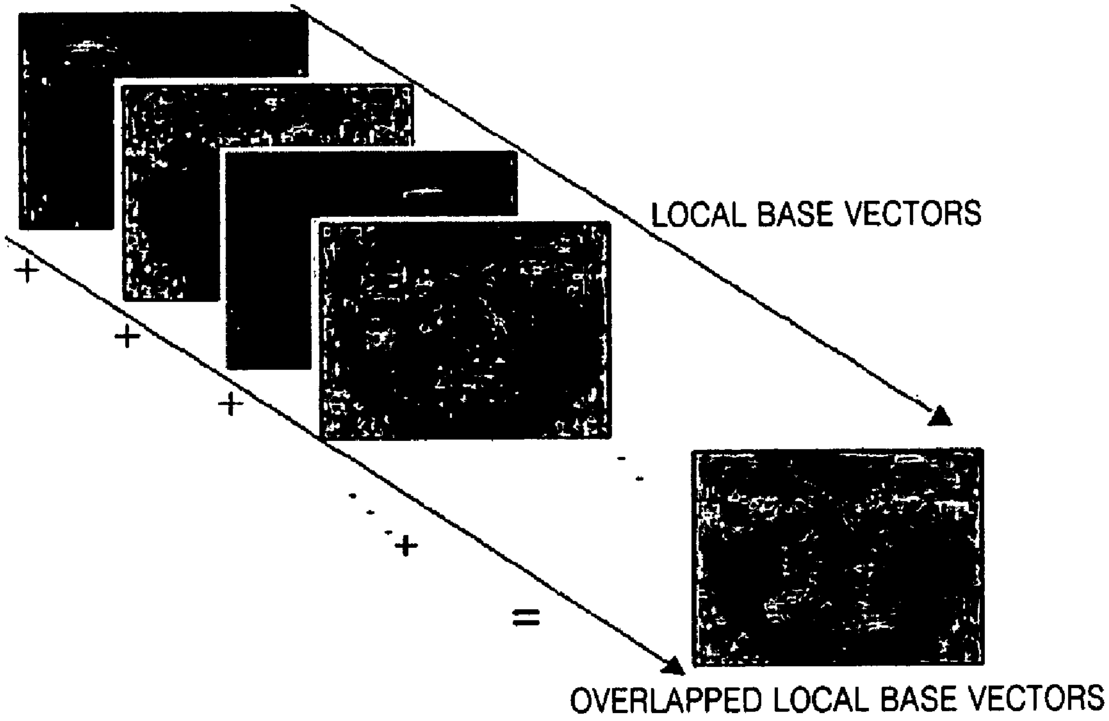
FIG. 5 illustrates a procedure of overlapping local base vectors in a local base vector overlapper illustrated in FIG. 1.
Figure 6:
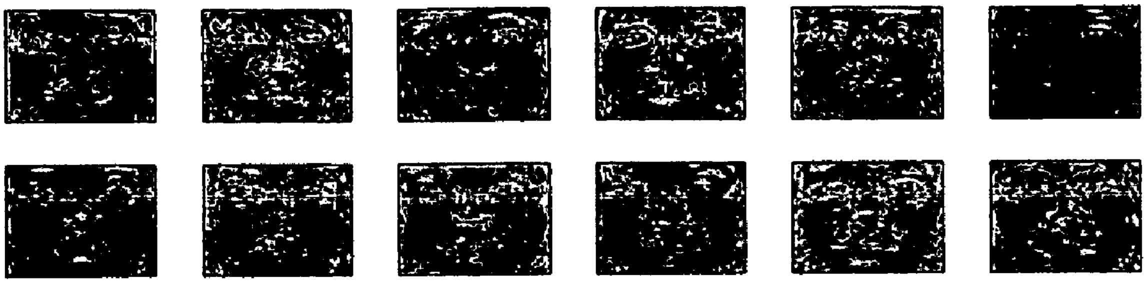
FIG. 6 illustrates the local base vectors overlapped by the local base vector overlapper illustrated in FIG. 1.

FIG. 5 illustrates a procedure of overlapping the local base vectors in the local base vector overlapper illustrated in FIG. 1. FIG. 6 illustrates the local base vectors overlapped by the local base vector overlapper illustrated in FIG. 1.

The final base vectors generated by the local base vector generator 100, the local base vector selector 120, and the local base vector overlapper 140 are used as base vectors for extracting face features in the face feature extractor 160. Face features are extracted by linearly projecting an input image on the overlapped base vector as below. The features of the face image are the output values of the overlapped base vectors.

$$z = g^T x \tag{12}$$

wherein z denotes an output of the overlapped base vector, and x denotes an input face image.

Therefore, the face feature extractor 160 that stores the overlapped base vector is only used in the face identification system.

Figure 7:
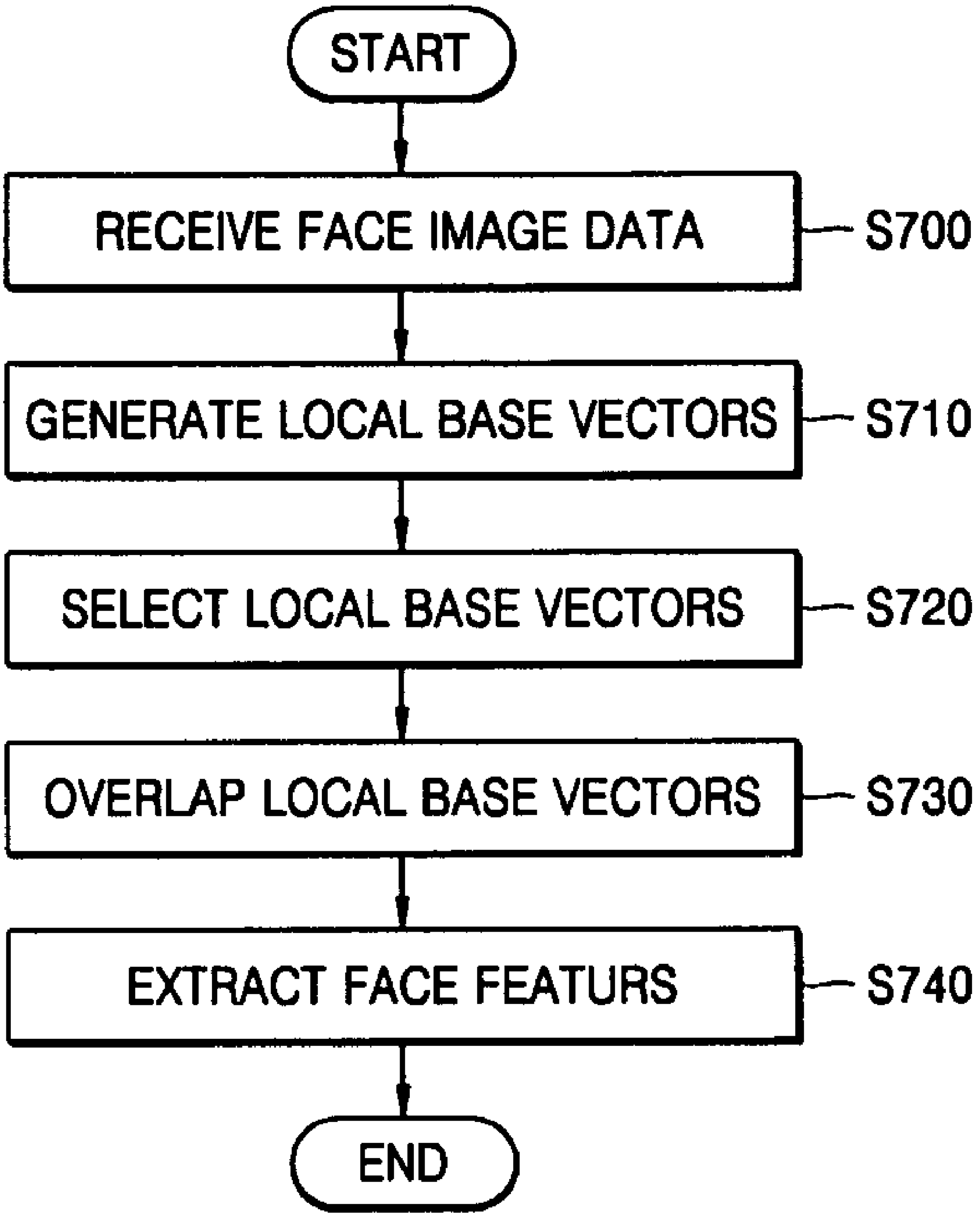
FIG. 7 is a flowchart illustrating a face feature extraction method according to an embodiment of the present invention.

FIG. 7 is a flowchart illustrating a face feature extraction method according to an embodiment of the present invention. Referring to FIG. 7, 2D face image data of a user is input (Operation S700). Local base vectors are generated to extract features of portions of a face such as eyes, nose, chin, cheeks, and the contour of the face from the input face image (Operation S710).

Local base vectors suitable for the face identification are selected from the generated local base vectors (Operation S720).

The selected local base vectors are overlapped such that a smaller number of the overlapped local base vectors than the selected local base vectors can be generated (Operation S730).

The face features are extracted by linearly projecting the 2D face image of the user on the overlapped local base vectors (Operation S740).

Refer to FIGS. 1 through 6 for more detailed description regarding FIG. 7.

Figure 8:
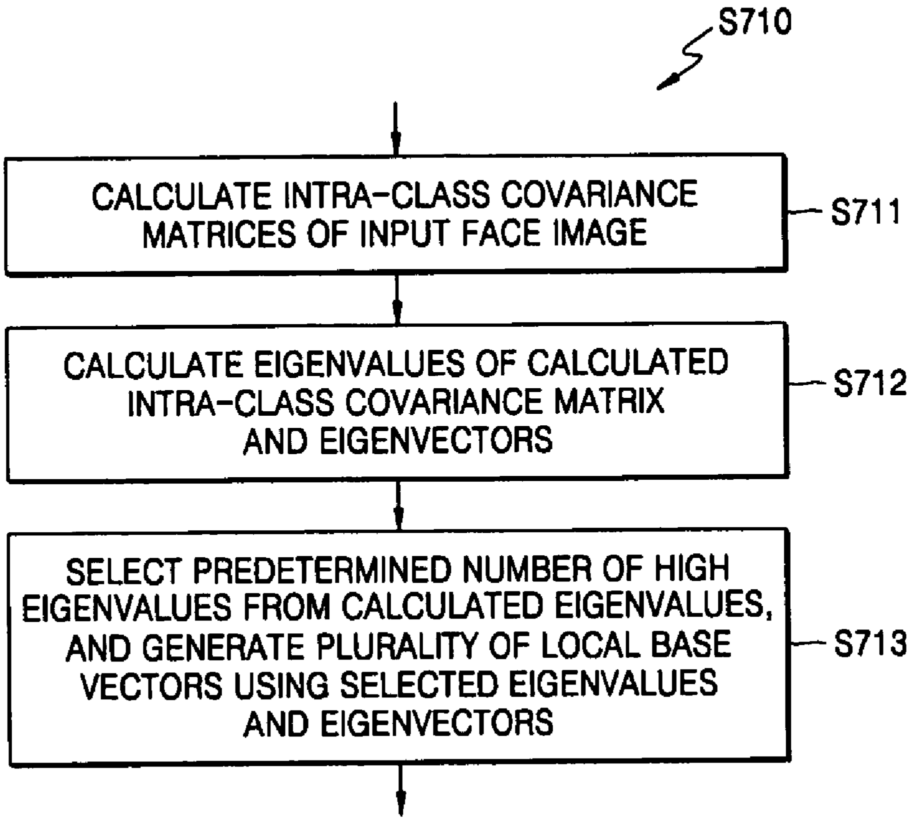
FIG. 8 is a flowchart illustrating a local base vector generation operation illustrated in FIG. 7.

FIG. 8 is a flowchart illustrating the local base vector generation operation illustrated in FIG. 7. Referring to FIG. 8, covariance matrices of the input face image data of each of users are calculated and an intra-class covariance matrix is calculated by summing the calculated covariance matrices (Operation S711).

Eigenvalues of the calculated intra-class covariance matrix and eigenvectors matched with the eigenvalues are calculated (Operation S712).

A predetermined number of high eigenvalues are selected from the calculated eigenvalues, and a plurality of local base vectors which are regions for extracting features of portions of the face are generated using the selected eigenvalues and the eigenvectors (Operation S713).

Refer to FIGS. 1 through 7 for more detailed description regarding FIG. 8.

Figure 9:
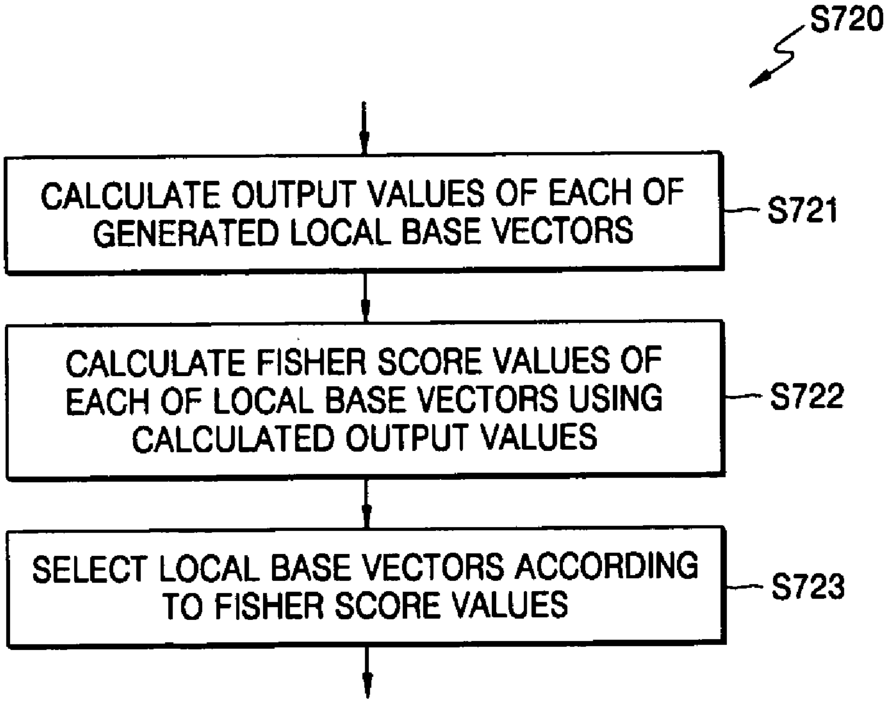
FIG. 9 is a flowchart illustrating a local base vector selection operation illustrated in FIG. 7.

FIG. 9 is a flowchart illustrating the local base vector selection operation illustrated in FIG. 7. Referring to FIG. 9, output values of each of the generated local base vectors resulting from Operation S710 are calculated by linearly projecting the input face image data of the users on each of the local base vectors (Operation S721).

Fisher Score values indicating a discrimination power of each of the local base vectors are calculated using the calculated output values (Operation S722).

A predetermined number of high Fisher Score values are selected from the calculated Fisher Score values, such that a predetermined number of local base vectors for the face identification are selected from the local base vectors (Operation S723).

Refer to FIGS. 1 through 7 for more detailed description regarding FIG. 9.

Figures 10, 11:
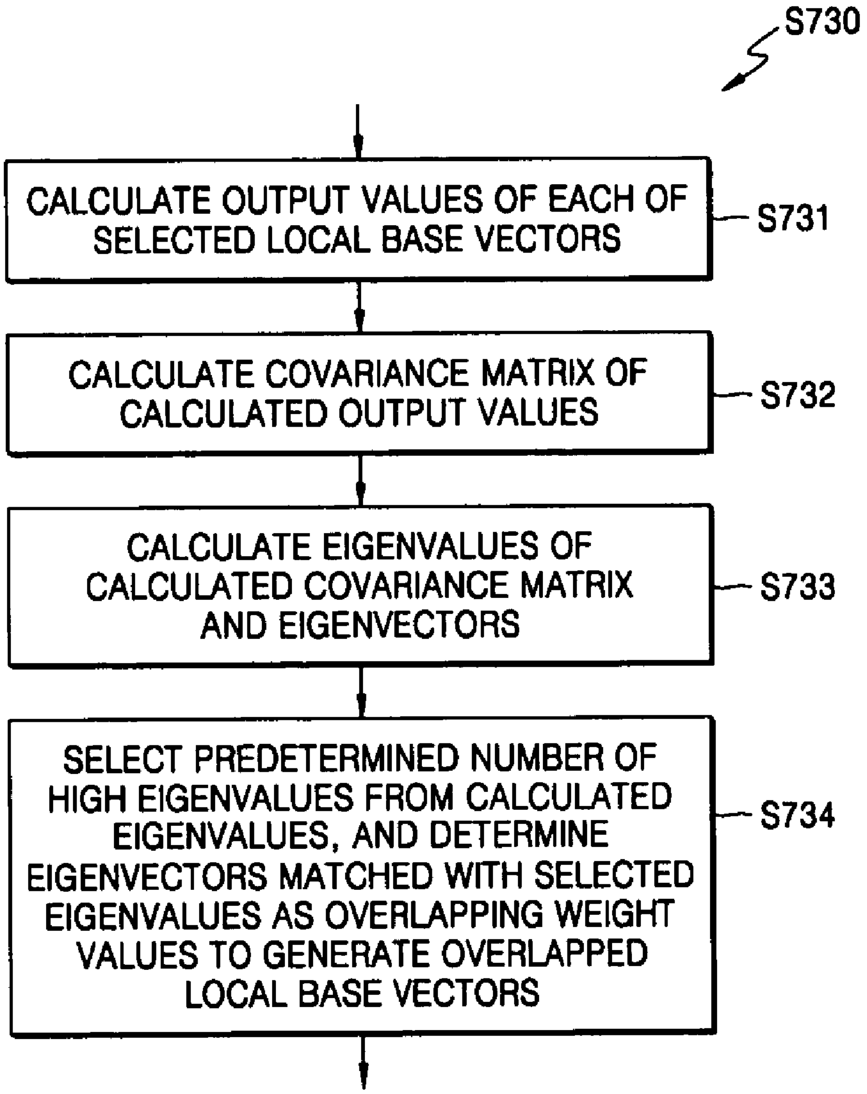
FIG. 10 is a flowchart illustrating a local base vector overlapping operation illustrated in FIG. 7.
FIG. 11 is a table illustrating a comparison between face identification rates obtained by extracting face features according to a conventional face feature extraction method and the face feature extraction method of the present invention.

FIG. 10 is a flowchart illustrating the local base vector overlapping operation illustrated in FIG. 7. Referring to FIG. 10, output values of each of the selected local base vectors resulting from Operation S720 are calculated by linearly projecting the input face image data of the users on each of the local base vectors (Operation S731).

A covariance matrix of the calculated output values is calculated (Operation S732).

Eigenvalues of the calculated covariance matrix and eigenvectors matched with the eigenvalues are calculated (Operation S733).

A predetermined number of high eigenvalues are selected from the calculated eigenvalues, and eigenvectors matched with the selected eigenvalues are determined as overlapping weight values to generate overlapped local base vectors (Operation S734).

For a better understanding of FIG. 10, the user is referred to FIGS. 1 through 7.

FIG. 11 is a table illustrating a comparison between face identification rates obtained by extracting face features according to a conventional face feature extraction method and the face feature extraction method of the present invention.

Figure 12:
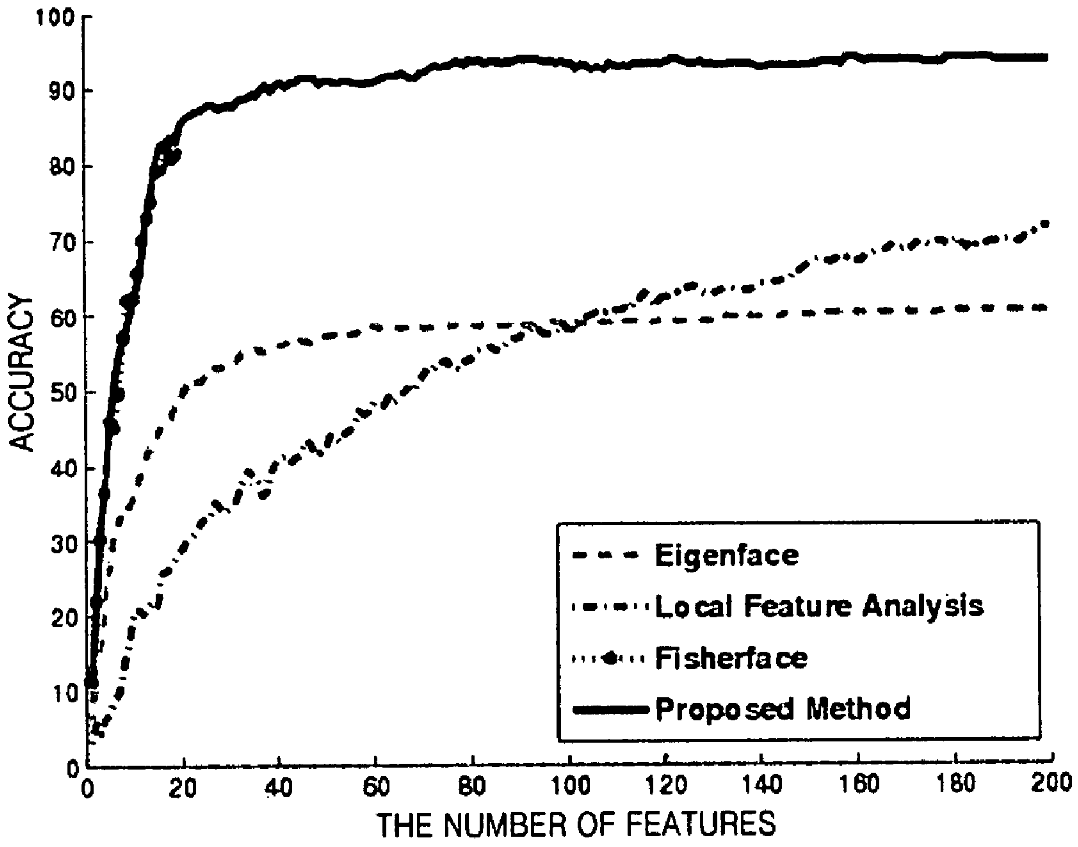
FIG. 12 is a graph illustrating the face identification rates obtained by extracting face features according to the conventional face feature extraction method and the face feature extraction method of the present invention.

FIG. 12 is a graph illustrating the face identification rates obtained by extracting face features according to the conventional face feature extraction method and the face feature extraction method of the present invention. FIGS. 11 and 12 illustrate comparisons between face identification results (1:N) according to the conventional face feature extraction method and the face feature extraction method of the present invention.

Twenty face photos of fifty-five persons are used as the face image data. Four hundred face photos of twenty persons are used to generate base vectors for extracting face features. Among face photos of other thirty-five persons, ten face photos each person are used for registration and test, respectively. The Euclidean distance is used to compare features of registered face galleries and test probes. Such a comparison is used to make the test easier. Meanwhile, other comparison methods are used to increase face identification performance after the face feature extraction.

Referring to FIG. 11, (a) uses a face feature extraction method of Eigenface, (b) uses a face feature extraction method of LFA, Local Feature Analysis, (c) uses a face feature extraction method of Fisherface, and (d) uses the face feature extraction method of the present invention. (a) uses 178 base vectors, (b) uses 199 base vectors, (c) uses 17 base vectors, and (d) uses 158 base vectors.

Rank 1 indicates that as a result of comparing the features of the registered face galleries and test probes according to each of the four face feature extraction methods, the same registered face image as a test image is searched as a first rank. Rank 2 indicates that as a result of comparing the features of the registered face galleries and test probes according to each of the four face feature extraction methods, the same registered face image as the test image is searched as the first rank or a second rank. Rank 3 indicates that as a result of comparing the features of the registered face galleries and test probes according to each of the four face feature extraction methods, the same registered face image as the test image is searched as the first rank through a third rank. Rank 4 indicates that as a result of comparing the features of the registered face galleries and test probes according to each of the four face feature extraction methods, the same registered face image as the test image is searched as the first rank through a fourth rank. Rank 5 indicates that as a result of comparing the features of the registered face galleries and test probes according to each of the four face feature extraction methods, the same registered face image as the test image is searched as the first rank through a fifth rank.

The present invention has the highest face identification rate from Ranks 1, 2, 3, 4, and 5.

Referring to FIG. 12, the graph illustrates the face identification rate of Rank 1 in each of the four face feature extraction methods with increments of the number of features.

The present invention uses the face feature extraction method in face identification (1:N) for, not restricted thereto, and face verification (1:1).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

The face feature extraction apparatus and method of the present invention can be used for a 2D face identification system having high face identification rate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A face feature extraction apparatus for use in a two-dimensional (2D) face identification system, the apparatus comprising:

a local base vector generator generating a plurality of local base vectors from an intra class covariance matrix to extract features of portions of a face from input 2D face image data of users, wherein the extraction of features of portions of a face includes determining the location of said face features;

a local base vector selector selecting a predetermined number of local base vectors suitable for face identification from the plurality of local base vectors generated by the local base vector generator; and a local base vector overlapper overlapping the local base vectors selected by the local base vector selector and generating a smaller number of overlapped local base vectors than the selected local base vectors, wherein the plurality of local base vectors correspond to local features of the face from the 2D face image data, and wherein the local vector overlapper is configured to be performed prior to determining a location of the face features.

2. The apparatus of claim 1, further comprising: a face feature extractor extracting the face features by linearly projecting the 2D face image data of the users on the local base vectors overlapped by the local base vector overlapper.

3. The apparatus of claim 1, wherein the local base vector generator comprises:

an intra-class covariance matrix calculator calculating covariance matrices of each of the users with regard to the 2D face image data, and calculating an intra-class covariance matrix by summing the calculated covariance matrices;

an eigenvalue/eigenvector calculator calculating eigenvalues of the intra-class covariance matrix calculated by the intra-class covariance matrix calculator and eigenvectors matched with the eigenvalues;

a generator selecting a predetermined number of high eigenvalues from the calculated eigenvalues, and generating a plurality of local base vectors for extracting features of portions of the face using the selected eigenvalues and the eigenvectors.

4. The apparatus of claim 3, wherein each of the plurality of local base vectors generated by the generator represents a column or a row of a matrix obtained by sequentially multiplying a matrix of the selected eigenvectors, a diagonal matrix obtained by collecting inverse numbers of the selected eigenvalues, and a transpose matrix of the matrix of the selected eigenvector.

5. The apparatus of claim 1, wherein the local base vector selector comprises:

an output value calculator calculating output values of each of the local base vectors generated by the local base vector generator by linearly projecting the input face image data of the users on each of the local base vectors;

a Fisher Score value calculator calculating Fisher Score values indicating a discrimination power of each of the local base vectors using the output values calculated by the output value calculator; and a selector selecting a predetermined number of high Fisher Score values from the calculated Fisher Score values in order to select a predetermined number of local base vectors for face identification from the local base vectors.

6. The apparatus of claim 1, wherein the local base vector overlapper comprises:

an output value calculator calculating output values of the local base vectors by linearly projecting the input face image data of the plurality of users on the local base vectors selected by the local base vector selector;

a covariance matrix calculator calculating a covariance matrix of the output values calculated by the output value calculator;

an eigenvalue/eigenvector calculator calculating eigenvalues of the covariance matrix calculated by the covariance matrix calculator and eigenvectors matched with the eigenvalues; and an overlapper selecting a predetermined number of high eigenvalues from the calculated eigenvalues, determining eigenvectors matched with the selected eigenvalues as overlapping weight values, and generating overlapped local base vectors.

7. A face feature extraction method for use by a 2D face identification system, the method comprising:

(a) generating a plurality of local base vectors from an intra-class covariance matrix to extract features of portions of a face from input 2D face image data of users, wherein the extraction of features of portions of a face includes determining the location of said face features, and wherein the plurality of local base vectors correspond to local features of the face from the 2D face image data;

(b) selecting a predetermined number of local base vectors suitable for the face identification from the plurality of local base vectors generated in operation (a); and (c) overlapping the local base vectors selected in operation (b) and generating a smaller number of overlapped local base vectors than the selected local base vectors, wherein the overlapping step is configured to be performed prior to determining a location of the face features.

8. The method of claim 7, further comprising: (d) extracting the face features by linearly projecting the 2D face image data of the users on the local base vectors overlapped in operation (c).

9. The method of claim 7, wherein operation (a) comprises:

(a1) calculating covariance matrices of each of users with regard to the 2D face image data, and calculating an intra-class covariance matrix by summing the calculated covariance matrices;

(a2) calculating eigenvalues of the intra-class covariance matrix calculated in operation (a1) and eigenvectors matched with the eigenvalues;

(a3) selecting a predetermined number of high eigenvalues from the calculated eigenvalues, and generating a plurality of local base vectors for extracting features of portions of the face using the selected eigenvalues and the eigenvectors.

10. The method of claim 9, wherein the plurality of local base vectors generated in operation (a3) are composed of a column or a row among a matrix obtained by sequentially multiplying a matrix of the selected eigenvectors, a diagonal matrix obtained by collecting inverse numbers of the selected eigenvalues, and a transpose matrix of the matrix of the selected eigenvector.

11. The method of claim 7, wherein operation (b) comprises:

(b1) calculating output values of each of the local base vectors generated in operation (a) by linearly projecting the input face image data of the users on each of the local base vectors;

(b2) calculating Fisher Score values indicating a discrimination power of each of the local base vectors using the output values calculated in operation (b1); and (b3) selecting a predetermined number of high Fisher Score values from the calculated Fisher Score values in order to select a predetermined number of local base vectors for the face identification from the local base vectors.

12. The method of claim 7, wherein operation (c) comprises:

(c1) calculating output values of the local base vectors by linearly projecting the input face image data of the plurality of users on the local base vectors selected in operation (b);

(c2) calculating a covariance matrix of the output values calculated in operation (c1);

(c3) calculating eigenvalues of the covariance matrix calculated in operation (c2) and eigenvectors matched with the eigenvalues; and (c4) selecting a predetermined number of high eigenvalues from the calculated eigenvalues, determining eigenvectors matched with the selected eigenvalues as overlapping weight values, and generating overlapped local base vectors.

* * * * *